US010717667B2

(12) United States Patent
Di Giuseppantonio et al.

(10) Patent No.: US 10,717,667 B2
(45) Date of Patent: Jul. 21, 2020

(54) NECK RING HOLDER DEVICE FOR MACHINES FOR FORMING GLASS CONTAINERS AND METHOD FOR MANUFACTURING SUCH CONTAINERS

(71) Applicant: BORMIOLI LUIGI S.p.A., Parma (IT)

(72) Inventors: Vincenzo Di Giuseppantonio, Fidenza (IT); Simone Baratta, Parma (IT); Massimo Barbacini, Parma (IT); Lorenzo Sartori, Parma (IT)

(73) Assignee: BORMIOLI LUIGI S.P.A., Parma (PR) (IT)

( * ) Notice: Subject to any disclaimer, the term of this patent is extended or adjusted under 35 U.S.C. 154(b) by 209 days.

(21) Appl. No.: 15/699,725

(22) Filed: Sep. 8, 2017

(65) Prior Publication Data

US 2018/0072603 A1 Mar. 15, 2018

(30) Foreign Application Priority Data

Sep. 9, 2016 (IT) .......................... 102016000091405

(51) Int. Cl.
*C03B 9/353* (2006.01)
*C03B 9/34* (2006.01)
*C03B 9/193* (2006.01)
*C03B 9/36* (2006.01)
*C03B 9/447* (2006.01)

(52) U.S. Cl.
CPC ............ *C03B 9/3535* (2013.01); *C03B 9/342* (2013.01); *C03B 9/1932* (2013.01); *C03B 9/3618* (2013.01); *C03B 9/3654* (2013.01); *C03B 9/447* (2013.01)

(58) Field of Classification Search
CPC ... C03B 9/1932; C03B 9/3618; C03B 9/3654; C03B 9/447; C03B 9/3535
See application file for complete search history.

(56) References Cited

U.S. PATENT DOCUMENTS

| 2004/0231363 | A1* | 11/2004 | Monden ................ C03B 9/1932 65/77 |
| 2006/0010918 | A1 | 1/2006 | Flynn |
| 2010/0203270 | A1* | 8/2010 | Langsdorf ........... A61M 5/3129 428/34.4 |
| 2014/0090420 | A1* | 4/2014 | Bratton ................. C03B 9/3841 65/64 |
| 2015/0175466 | A1 | 6/2015 | Flynn |

OTHER PUBLICATIONS

Italian Patent Office Search Report dated Jul. 14, 2017.

* cited by examiner

*Primary Examiner* — Queenie S Dehghan
(74) *Attorney, Agent, or Firm* — Hedman & Costigan, P.C.; James V. Costigan; Kathleen A. Costigan

(57) ABSTRACT

A neck ring holder device intended to be used at a mould for forming glass containers (30), wherein the neck ring (41) for realizing the mouth (32) of the container can be opened and consists of a plurality of circumferential sectors (44) that can be moved apart from a closed position of the neck ring (41), in which the circumferential sectors (44) are coplanar and form a substantially continuous annular element, up to an open position of the neck ring (41), in which the circumferential sectors (44) are rotated out of said coplanar configuration, moving away from each other, about axes directed perpendicular to the direction of the axis (45) of said annular element, is characterised in that the movement of the circumferential sectors (44) from the closed position to the open position.

3 Claims, 4 Drawing Sheets

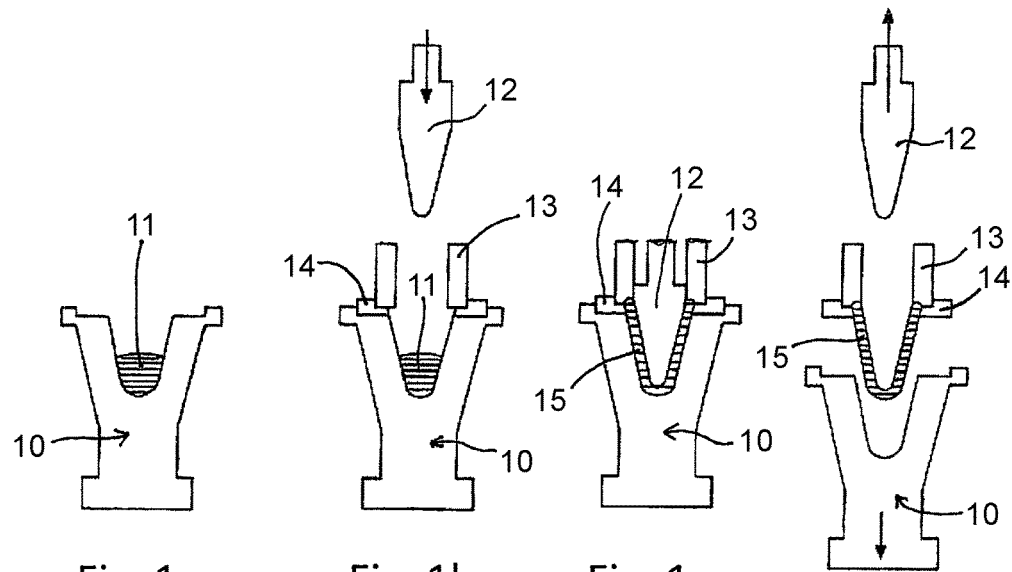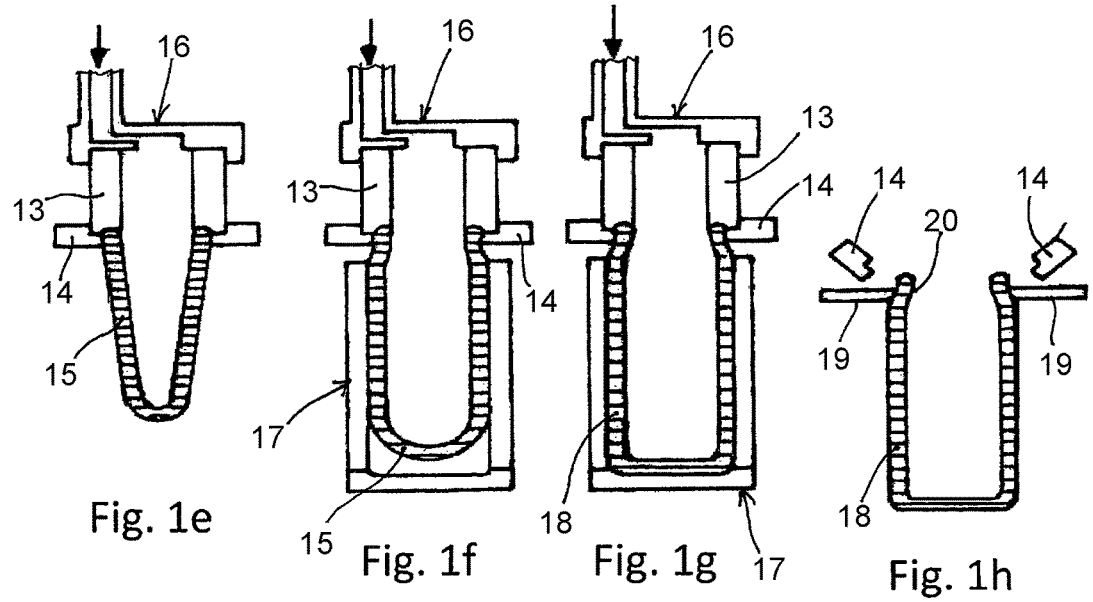

NECK RING HOLDER DEVICE FOR MACHINES FOR FORMING GLASS CONTAINERS AND METHOD FOR MANUFACTURING SUCH CONTAINERS

The present invention refers to a neck ring holder device intended to be used at a mould for forming glass containers, in particular cosmetics jars with threaded mouth. Of course, the neck ring holder device according to the invention can also be intended for the production of jars provided with different functional closing elements, such as straps, grooves, etc.

The invention also refers to a method for manufacturing containers using such an innovative neck ring holder device and to a container made by means of such a method.

In the prior art, three technologies are generally used to produce glass containers, said technologies differing from one another both in terms of the sequence of operations that are carried out, and in terms of the geometric, dimensional and finishing characteristics that each of them makes it possible to obtain.

A first technology is the so-called "press" technology, in general used to produce objects with a large mouth, or even without a mouth, for example drinking glasses, in which the definitive shape of the object is obtained by means of a piston that is made to penetrate into the gob of molten glass present in the mould (at temperatures generally comprised between 1000° C. and 1200° C.) to directly make, in cooperation with the walls of the mould, the finished object.

"Press" technology can be used to make containers having transversal dimension equal to or greater than their height, such as cosmetics jars. However, since the internal width of the container is determined by the shape of the piston, the internal cavity will never be wider than the mouth even in containers having a transversal dimension greater than the height and, consequently, possible cosmetics jars thus obtained will always have thick walls.

"Press" technology has the advantage that it is possible, during the pressure-moulding operation, to also make the thread of the mouth. However, as stated, such technology has the drawback of high wall thickness of the container (generally greater than 2 mm), which is thus particularly heavy in relation to the capacity of the container itself: indeed, it is not possible, with this technology, to make containers with weight/capacity ratio below 2 $g/cm^3$. Moreover, the shape of the object must necessarily be frusto-conical in order to be able to be extracted from the mould, unless openable moulds are used, but they leave visible joining marks on the product.

A second technology is the so-called "press-and-blow" technology, which consists of two successive forming steps. During the first step (pressing), a piston is inserted into the gob of molten glass present in a first mould (preparation mould) to form a hollow body blank, called "parison", the mouth of which is already the definitive one of the finished container. Thereafter, the parison is extracted from the first mould and inserted into a second mould (finishing mould), having internal shape corresponding to that of the finished container, where air (generally at about 1-3 bar) is blown inside the parison making it take up the definitive shape of the container, corresponding to that of the internal seat of the mould. Since the size of the mouth is determined by the size of the piston inserted in the preparation mould, "press-and-blow" technology is generally used for producing containers with a particularly wide mouth (typically greater than 35 mm).

A third technology is the so-called "blow-and-blow" technology, which also consists of two successive forming steps but, unlike "press-and-blow" technology, the first step of forming the parison in the preparation mould is also carried out through compressed air, thus also making it possible to make a mouth of the parison that is appreciably narrow, since the mouth portion is moulded by the compressed air on the shape of the inlet portion of the preparation mould. "Blow-and-blow" technology is thus generally used for producing containers with a narrow mouth, typically bottles. Thereafter, the parison is extracted from the first mould and inserted in a second mould (finishing mould), having internal shape corresponding to that of the finished container (typically the body of the bottle), where further air is blown inside the parison making it take up the definitive shape of the container. This technology does not, however, manage to ensure an optimal internal distribution of the glass, in particular when the intention is to obtain thin thicknesses.

An excellent technology for producing glass containers is that which uses the machine known in the field as "Hartford 28" (briefly H28), which exploits "press-and-blow" technology to make containers provided with thin walls and excellent surface finishing, particularly suitable for tableware.

In accordance with the "press-and-blow" technology described above, the use of a H28 machine provides for a first step in which a piston is inserted into the gob of molten glass present in the preparation mould in order to obtain, by pressing, a parison with respective upper shell necessary for the subsequent movements of the piece. Thereafter, the parison is extracted from the preparation mould, and transferred, supported by the neck ring that has formed the aforementioned upper shell, to the finishing mould, where pressurised air is blown inside the parison (always supported by the neck ring set in rotation) to obtain the final shape.

At the end of the blowing step, the mould and the neck ring are opened and the piece is extracted, through grippers that clamp around the upper shell, to be transferred to the subsequent processing stations. If the product thus made is a drinking glass, or the bowl of a stem glass, a further processing step could be so-called "cracking off", i.e. the cutting and removal of the aforementioned upper shell formed by the neck ring. The technologies described above, however, do not make it possible to make containers having transversal size equal to or greater than their height and provided with a threaded mouth, typically like cosmetics jars, which have sufficiently thin wall thickness as to allow weight/capacity ratios of less than 2 $g/cm^3$, even up to 0.5 $g/cm^3$, to be reached.

Technologies that make it possible to obtain very thin wall thicknesses, such as "blow-and-blow" or "press-blow" (like that used by the H28 machine, for example), are however universally intended for making containers, like drinking glasses or similar, in which the upper shell formed by the neck ring for support of the parison is already shaped according to the desired definitive configuration for the container, or is even cut and removed to obtain a wider opening with regular and aesthetically pleasing edge.

Moreover, it should be considered that the normal heads for forming the mouth portion used in H28 machines, which have the neck ring opening in sectors according to a tilting rotation movement, involve a substantial complexity in the opening kinematic mechanism.

Indeed, if it was wished to use only two neck ring sectors (in order to simplify the structure as much as possible), consisting of two semi-circular arcs or rings facing one another and able to open in a mirroring manner by rotation around axes parallel to one another, the most extreme portions of such semi-circular rings would interfere, during the first step of their rotation, with the shoulder portions of the container (i.e. the area that makes the transition between the mouth and the body of the container itself).

For this reason, in H28 machines intended for making containers with mouth narrower than the body, the neck ring is usually divided into four sectors extending for 90° each.

The general purpose of the present invention is to avoid the aforementioned drawbacks by providing a neck ring holder device for machines for forming glass containers, adapted for supporting and opening a neck ring in sectors with threaded die for making the mouth portion of the containers, in particular cosmetics jars, provided with threaded mouth and sufficiently thin walls as to allow weight/capacity ratios lower than 2 $g/cm^3$, even up to 0.5 $g/cm^3$, to be obtained.

A further purpose of the present invention is to provide a neck ring holder device, in which the neck ring can be opened without the risk of interference with the shoulder portions of the container even if it is made with only two semi-circular annular portions.

The purpose of the present invention is also to provide a method for making such containers with thin wall and mouth narrower than the body, using machines that exploit "press-and-blow" or "blow-and-blow" technology. For the purposes of the present invention, the term "thin wall" is meant to indicate a thickness lower than 1.5 mm and preferably lower than 1 mm, in the area of the body of the container, nevertheless taking into account that the real distribution of the thickness of the glass is actually variable according to the specific shape of the product.

In view of such purposes, it has been thought of to make, according to the invention, a neck ring holder device intended to be used at a mould for forming glass containers having a mouth, in which the neck ring for realizing the mouth can be opened and consists of a plurality of circumferential sectors that can be moved away from each other starting from a closed position of the neck ring, in which the circumferential sectors are coplanar and form a substantially continuous annular element provided with a central axis, up to an open position of the neck ring, in which the circumferential sectors are rotated out of said coplanar configuration, moving away from each other, around axes directed perpendicular to the direction of the axis of said annular element, characterised in that the circumferential sectors are movable from the closed position to the open position according to a sequential movement consisting of the composition of a first radial translation movement, in said coplanar configuration, of each circumferential sector moving away from the axis of said annular element, and of a second rotation movement of each circumferential sector around a respective axis directed perpendicular to the direction of the axis of said annular element, an intermediate position of the neck ring being identified between the translation movement and the rotation movement, in which the circumferential sectors are in the coplanar configuration.

According to the invention a method has also been devised for manufacturing glass containers having thin lateral walls and a mouth narrower than the body defined by said lateral walls, comprising at least one step of mould forming by introducing blown air into a glass hollow body blank within the mould, wherein said glass body is supported in the mould by means of a neck ring that can be opened, suitable for realization of the mouth of the container and consisting of a plurality of circumferential sectors that can be moved away from each other, the method further comprising a step of opening the neck ring at the end of the mould forming step, wherein each circumferential sector performs, starting from a closed position of the neck ring, in which the circumferential sectors are coplanar and form a substantially continuous annular element provided with a central axis, a first radial translation movement, in said coplanar configuration, moving away from the axis of said annular element, followed by a second rotation movement of each circumferential sector around a respective axis directed perpendicular to the direction of the axis of said annular element, up to an open position of the neck ring, wherein the circumferential sectors are rotated out of said coplanar configuration, moving away from each other, around said axes directed perpendicular to the direction of the axis of said annular element.

In order to clarify the explanation of the innovative principles of the present invention and its advantages with respect to the prior art, hereinafter a possible embodiment applying such principles will be described, with the help of the attached drawings. In the drawings:

FIGS. 1a-1h schematically represent successive forming steps of a container according to "press-and-blow" technology.

Figure 2:
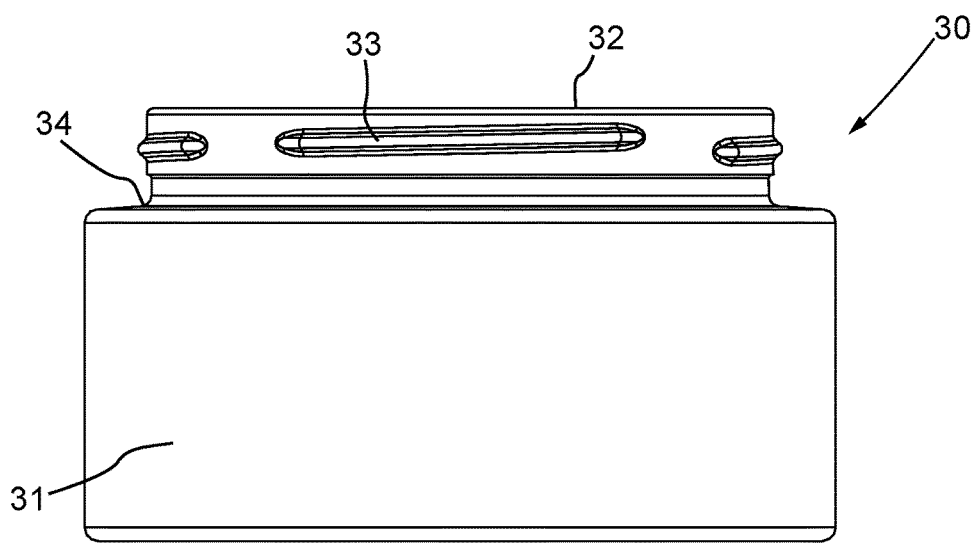
FIG. 2 represents a side view of a container made by means of a machine provided with neck ring holder device according to the invention.

With reference to the figures, FIG. 1a illustrates a preparation mould 10 in which a gob 11 of molten glass (advantageously at a temperature comprised between 1000° C. and 1200° C.) has been inserted, according to ways well known by those skilled in the art.

FIG. 1b shows the piston 12 that is lowered, approaching the preparation mould, whereas at the upper portion of the mould the ring 13 (having the function of a guide ring for the insertion of the piston) and the neck ring 14 for forming the mouth of the container have been applied.

FIG. 1c illustrates the piston 12 inserted, through the guide ring 13 and the neck ring 14, in the preparation mould to form a parison 15, i.e. a glass hollow body blank that will subsequently be refined to take up the definitive shape of the finished product.

FIG. 1d shows the piston 12 that is raised to move away from the preparation mould 10, which is in turn lowered to free the parison 15 supported by the neck ring 14.

The parison 15, supported by the neck ring 14 set in rotation, is then transferred (FIG. 1e) to a blowing head 16, positioned above the ring 13, and inserted (FIG. 1f) in a finishing mould 17 (having internal shape corresponding to that of the finished container and the walls of which are advantageously wetted with water), where a first low-pressure blowing step takes place. Thereafter, through the blowing head 16 high-pressure compressed air is blown inside the parison to make it take up the definitive shape of the container 18, corresponding to that of the internal seat of the finishing mould 17 (FIG. 1g).

The rotation of the parison 15 inside the finishing mould 17 during the blowing steps is made possible by the film of steam that is generated between the surface of the mould and the glass thanks to the wetting of the walls of the seat.

Once the blowing step has ended, the finishing mould 17 is opened, the blowing head 16 is retracted and the neck ring 14 is also opened, freeing the container 18 that can be taken through gripping and transferring grippers 19 that clamp around the upper mouth portion 20 previously formed by the neck ring (FIG. 1h). After this, the container 18 can be transferred, through the grippers 19 and possible other conveying means, to further processing stations, for example annealing furnace, etc.

It should be emphasised that the elements illustrated in FIGS. 1a-1h are represented totally schematically, to conceptually describe the sequence of operative steps, and are not meant to introduce any constraint or limitation either structurally or dimensionally, given that such details are, per se, well known by those skilled in the art.

FIG. 2 illustrates, in greater detail, a finished container 30 (typically a cosmetics jar) having lateral walls 31, which define the body of the container, and an upper mouth 32 provided with outer thread 33 for screwing of a closing cap, not shown in the figures.

Typically, in this type of container there is a shoulder portion 34, corresponding to the transition area between the mouth and the body of the container itself.

Figure 3:
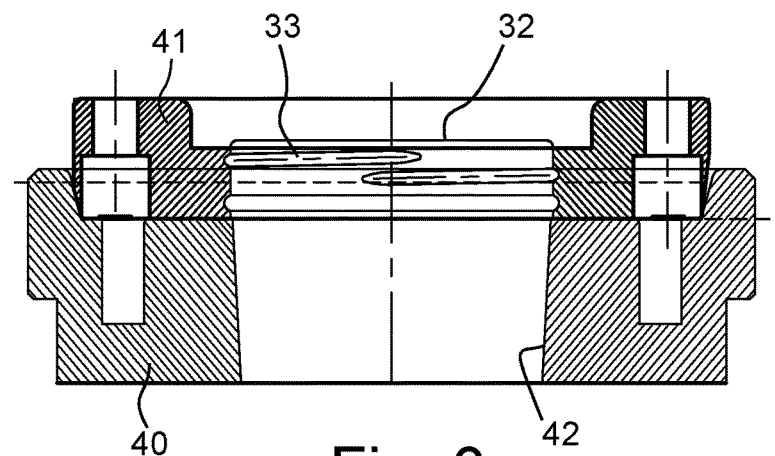
FIG. 3 represents a section view of the neck ring and of the preparation mould, with a container inserted at the end of the pressing step.

FIG. 3 shows a cross section of a mould 40 (with a container formed in it still inserted), coupled with a neck ring 41 provided with threaded die for making the thread 33 on the mouth 32 of the container.

With reference to the illustration of FIG. 3, the mould can for example be a preparation mould and the container inserted in its internal seat 42 will thus be a parison, in the step prior to its finishing through blowing. In a totally analogous way, as well known by those skilled in the art, the coupling between the neck ring 41 and a finishing mould can be made, where the container inserted in it would thus take on the size and shape features of the finished container.

Figure 4:
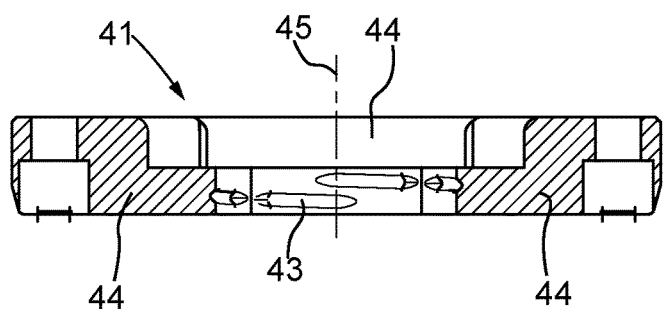
FIG. 4 represents a section view of a neck ring, with the die for making the thread on the mouth of the container.

FIG. 4 illustrates in greater detail, again in section, a neck ring 41 with the threaded die 43 for making the thread on the mouth of the container.

Figure 5:
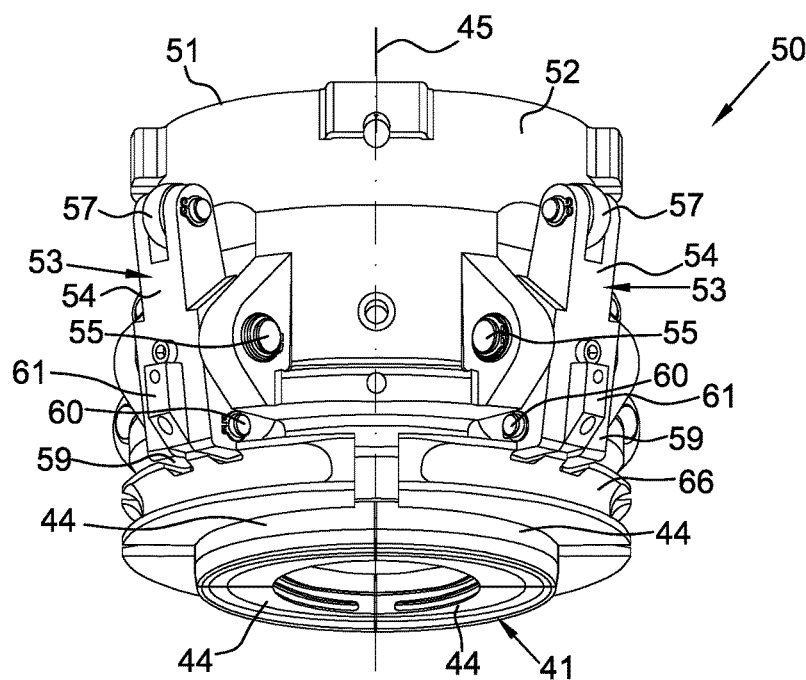
FIG. 5 represents an overall perspective view of the neck ring holder device according to the invention.
Figure 6:
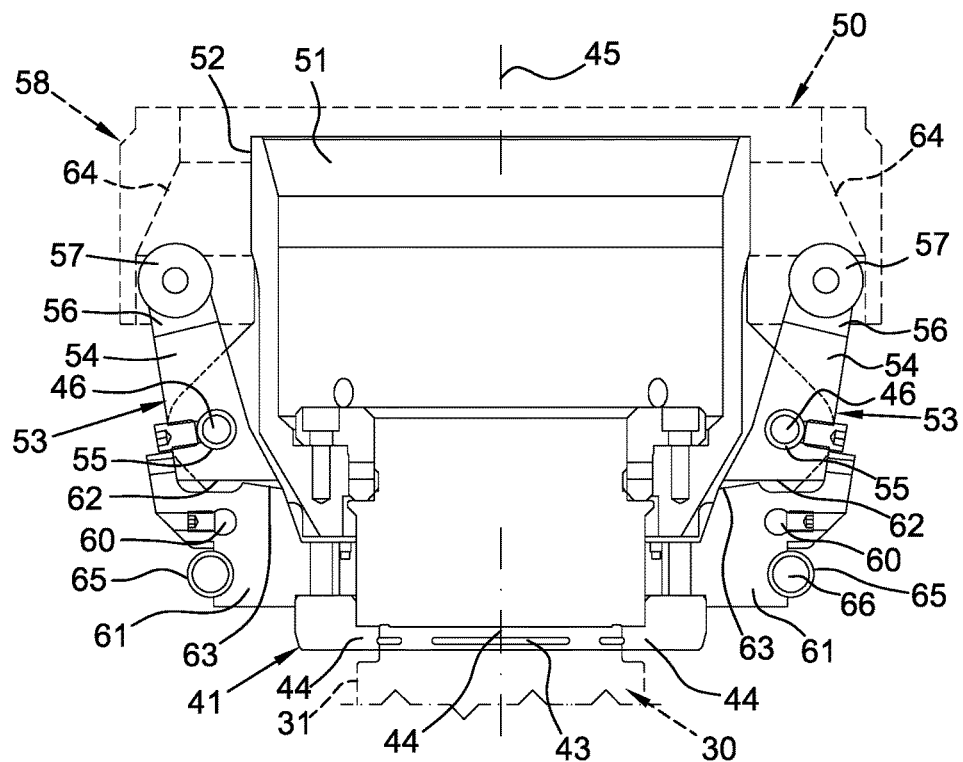
FIGS. 6 to 8 represent successive operative steps of the opening of the neck ring.
Figure 7:
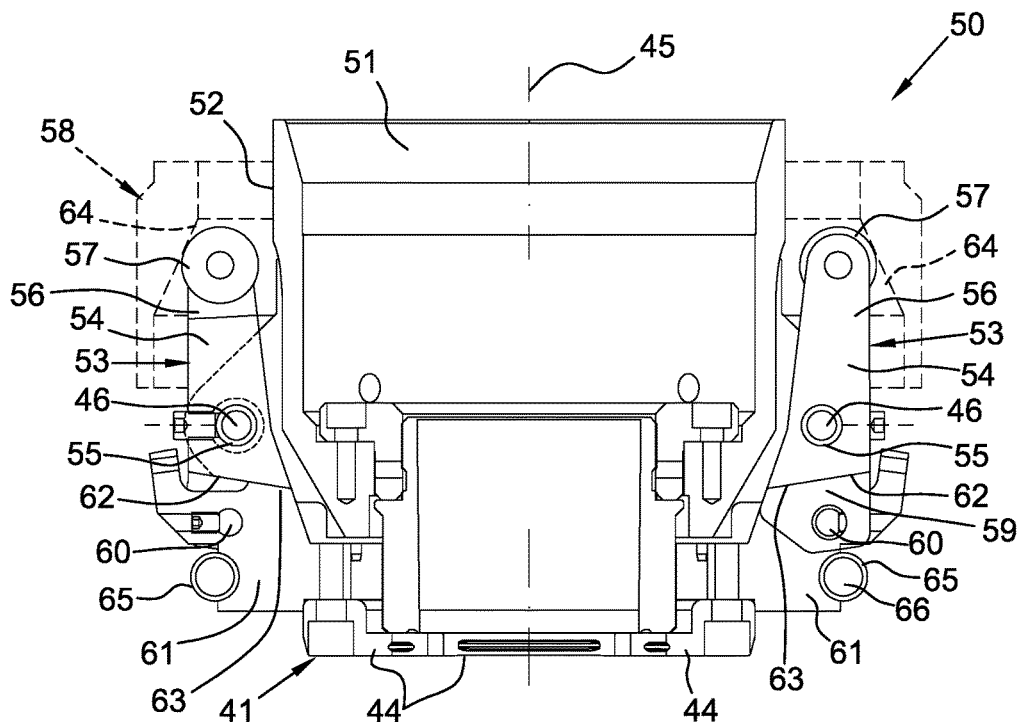
Figure 8:
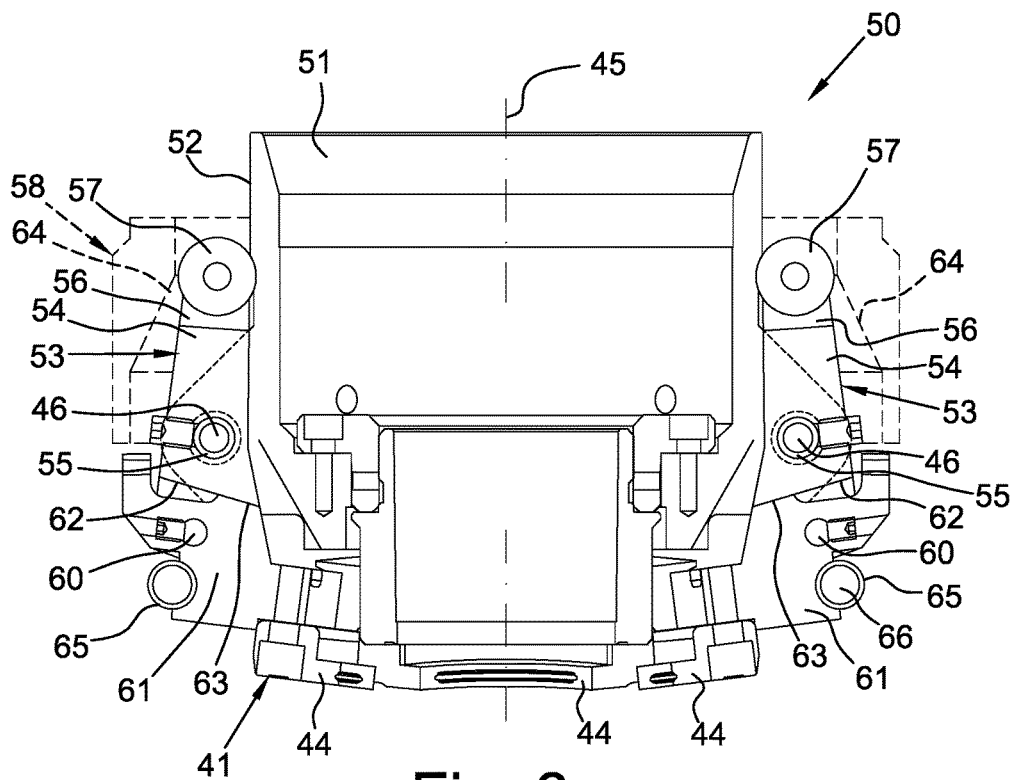

FIG. 5 wholly shows the neck ring holder device 50 according to the invention, whereas FIGS. 6-8 illustrate the same neck ring holder device 50 during successive operative opening steps of the neck ring 41.

In FIG. 6, to better clarify the interaction between the various parts, a container 30 still held by the closed neck ring is shown partially, with a dashed line, whereas in FIGS. 7 and 8 the container is not shown, so as not to obstruct the view of the opening movement of the neck ring.

The neck ring holder device 50 consists of a substantially cylindrical body 51, provided with lateral surface 52 extending around a longitudinal axis. Of course, the definition "substantially cylindrical" used here, as well known by those skilled in the art, means that the body 51 can possibly have a shape that is roughly cylindrical, for example prismatic with polygonal base, but staying within the scope and within the modes of operation described here.

At an end of the body 51 (the lower end in the illustrated examples), an annular-shaped neck ring 41 is arranged, intended to make the threaded mouth 32 of the container 30. For this purpose, the neck ring 41 is internally provided with a threaded die 43.

The neck ring 41 consists of a plurality of circumferential sectors 44 that, in the condition with the neck ring closed (illustrated in FIG. 6), are coplanar and form a substantially continuous annular element that constitutes a matrix for the formation of the mouth of the glass container, as well as gripping and holding means of the container itself at the mouth. Said annular element extends symmetrically around its own central axis 45, perpendicular to the plane of the neck ring in closed condition and advantageously coinciding with the longitudinal axis of the aforementioned body 51.

In the preferred embodiment, illustrated in the attached drawings, the circumferential sectors that jointly form the neck ring 41 are four in number, extending along an arc of 90° each.

The circumferential sectors 44 are designed to be moved starting from the aforementioned closed neck ring position (illustrated in FIG. 6), in which they are coplanar and form a substantially continuous annular element, to reach a final open neck ring condition (illustrated in FIG. 8), in which they are moved away from each other and rotated out of said coplanar configuration, around axes 46 directed perpendicular to the direction of the axis 45 of the annular element that forms the closed neck ring.

According to the invention, the circumferential sectors 44 are movable from the closed neck ring position of FIG. 6 to the open neck ring position of FIG. 8 according to a sequential movement consisting of the composition of a first radial translation movement, in said coplanar configuration, of each circumferential sector 44 moving away from the axis 45 of the annular element that forms the closed neck ring, and of a second rotation movement of each circumferential sector 44 around an aforementioned respective axis 46 directed perpendicular to the direction of the axis 45 of the neck ring 41.

Between the translation movement and the rotation movement an intermediate position of the neck ring 41 (illustrated in FIG. 7) is identified, in which the circumferential sectors 44 are still in the coplanar configuration.

In other words, during the first translation movement step the circumferential sectors 44 move on the common plane identified by the neck ring in closed condition, each one translating along a radial axis passing through the axis 45 of the neck ring. In this way, a first mutual movement of the sectors 44 away from each other (as well as a partial movement away from the mouth 32 of the container 30) is obtained without rotation of the sectors themselves. This first step of the opening movement of the neck ring can be defined "parallel opening", in the sense that the movement of the sectors 44 that form the neck ring takes place parallel to the common plane identified by the neck ring in closed condition.

During the second rotary movement step, starting from the intermediate position of FIG. 7, each circumferential sector 44 rotates around the respective axis 46 directed perpendicular to the direction of the axis 45 of the neck ring 41, so that the circumferential sectors 44 come out, rotating, from the common plane that was identified by the neck ring in closed condition and move further apart from one another to reach the final open neck ring condition illustrated in FIG. 8, adapted for allowing the finished container to be removed. This second step of the opening movement of the neck ring can be defined "tilting opening".

In order to make these movements of the circumferential sectors 44 from the initial position of FIG. 6 to the final position of FIG. 8 possible, the device 50 comprises a cam-operated lever system 53 for the sequential actuation of said translation and rotation movements of the circumferential sectors 44.

More specifically, the lever system 53 comprises, for each circumferential sector 44, a first class lever 54 arranged laterally with respect to the lateral surface 52 of the body 51 and pivoted, in intermediate fulcrum position 55, to the body itself.

The lever 54 is provided, at its end 56 furthest away from the respective circumferential sector 44, with a cam follower 57 (advantageously a roller) designed to cooperate with a cam actuator 58, as will be described better hereinafter, to drive the rotation of the lever and the consequent movement of the circumferential sectors 44 of the neck ring.

The lever 54 is also provided, at its opposite end 59, closest to the circumferential sector 44, with a pin 60 for hinging to a protrusion 61 integral with the circumferential sector 44.

The end 59 of the lever 54 is visible in FIG. 5 and also in the right portion of FIG. 7, where for the sake of graphical clarity a part of the protrusion 61 has been omitted in order to show the lever 54 in its entirety.

The straight line that joins said end pin 60 with the fulcrum 55 of the lever 54 is substantially perpendicular to the plane of the annular element that forms the neck ring in closed condition, so that during the small angular rotation of the lever 54 in the first step of the movement (equal to a few degrees) the pin 60, with the respective circumferential sector 44 constrained thereto, carries out a movement substantially parallel to the same plane of the annular element, obtaining said first radial translation movement of the corresponding circumferential sector 44.

The portion of the lever 54 comprised between the fulcrum 55 and the end 59, and more specifically between the fulcrum 55 and the pin 60 for hinging to the protrusion 61 integral with the circumferential sector 44, is also provided with an abutment surface 62 intended to abut against a corresponding abutment surface 63 of said protrusion 61 at the end of the first rotation step of the lever 54 corresponding to said first radial translation movement of the circumferential sector 44.

Once the abutment position between the abutment surfaces 62, 63, corresponding to the condition illustrated in FIG. 7, has been reached, a further rotation of the lever 54 makes the lever itself and the protrusion 61 move integrally in rotation with the corresponding circumferential sector 44, thus obtaining said second rotation movement of the circumferential sector 44 around the axis 46 (coinciding with the fulcrum 55 of the lever 54) up to the final condition of FIG. 8.

Schematically, therefore, during the first rotation step of the lever 54 (i.e. before its abutment surface 62 goes into abutment against the abutment surface 63 of the protrusion 61 integral with the circumferential sector 44) it is only the lever 54 that rotates, whereas the protrusion 61, with the respective circumferential sector 44, translates parallel to the plane of the annular element that forms the neck ring in closed condition, driven in such movement by the hinging pin 60. Once the abutment surface 62 of the lever 54 goes into abutment against the abutment surface 63 of the protrusion 61, the lever 54 and the protrusion 61 move integrally in rotation around the axis 46 (coinciding with the fulcrum 55 of the lever) thus obtaining the rotation movement of the circumferential sector 44 between the positions of FIG. 7 and FIG. 8.

As stated, the device 50 also comprises a cam actuator 58 provided with a cam surface adapted for engaging the cam-followers 57 to drive the actuation of the aforementioned rotation of the respective levers 54.

In the illustrated embodiment, the cam actuator 58 consists of a cylindrical shell that surrounds the body 51 of the device 50 and is movable coaxially thereto, along the longitudinal axis 45. Advantageously, the actuation of the levers 54 for opening the neck ring 41 takes place through lowering of the cylindrical shell with respect to the body 51, with reference to the figures.

The cylindrical shell that constitutes the cam actuator 58 is provided with an own inner surface (facing towards the lateral surface 52 of the body 51) that has a tapered portion 64, inclined with respect to the axis 45 to push, upon downward axial movement of the shell with respect to the body 51, the cam-followers 57 towards said lateral surface 52 causing the rotation of the levers 54 from the condition of FIG. 6 towards the conditions of FIG. 7 and FIG. 8.

As can be clearly seen in FIG. 6, in the closed neck ring condition the cam actuator 58 is at a height with respect to the body 51 such that the cam-followers 57 are upstream of the tapered portion 64 of the cam surface, so that the levers 54 can be kept with their upper end 56 away from the body 51 of the neck ring holder device thanks to the thrusting action of a spring 65 loaded so as to normally keep the circumferential sectors 44 in the closed neck ring position.

Advantageously, the spring 65 is a coil spring housed in a seat 66 circumferentially open along the perimeter of the protrusions 61 integral with the circumferential sectors 44, so as to be expanded by the opening movement of the circumferential sectors 44.

Since the neck ring 41 is intended to form a threaded mouth of the container 30, the openable circumferential sectors 44 that constitute the neck ring are internally provided with respective portions of a threaded die 43. Of course, the portion of threaded die 43 present on each circumferential sector 44 is sequential with respect to the portion present on the adjacent circumferential sector.

As the neck ring consists of a plurality of circumferential sectors, the thread that will be on the mouth of the container will not of course be continuous, but will have a number of interruptions corresponding to the number of sectors in which the neck ring is divided.

At this point it is clear how with the neck ring holder device according to the invention it is possible to make glass containers through H28 machines, thus with particularly thin walls, which have a threaded mouth as required by cosmetics jars and, in particular, how it is possible to avoid interference between the neck ring in the opening step and the shoulder portions of the container itself. Indeed, the first opening step of the neck ring through translation of the circumferential sectors 44 ("parallel opening") allows the sectors themselves to move away from the mouth of the container, before the start of their rotation movement ("tilting opening"), by a sufficient distance to avoid interferences, during the rotation, with the shoulder portions 34 of the container even if only two semi-circular sectors 44 are used to make the openable neck ring.

Of course, the above description of an embodiment applying the innovative principles of the present invention is given as an example of such innovative principles and therefore should not be taken to limit the scope of protection claimed here.

For example, the specific configuration of the cam actuator, adapted for driving the rotation of the levers 54, could be different from what has been schematically illustrated, just as the configuration of the elastic contrast means to the rotation of the levers themselves and of the circumferential sectors 44 could also be different, depending on particular constructive and/or functional requirements.

Moreover, the neck ring holder device according to the invention can also be used for producing containers having non-threaded mouth, in which the closure of the jar takes place through elastic straps or other means well known by those skilled in the art. In this case, the circumferential sectors 44 that form the neck ring 41 will lack the threaded die 43.

It is clear that, if the presence of a thread on the mouth of the jar involves the need to make a higher mouth with respect to the standard sizes, and therefore a neck ring of increased height must also be used, it is necessary to correspondingly modify the upper portion of the mould to be able to receive the neck ring of increased height. In practice, this modification of the mould consists of lowering the so-called "neck ring line", i.e. the support plane of the neck ring on the mould.

The invention claimed is:

1. Method for manufacturing glass containers (30) having thin lateral walls (31) and a mouth (32) narrower than the body defined by said lateral walls, comprising at least one step of mould forming by introducing blown air into a glass hollow body blank within the mould, wherein said glass body is supported in the mould by means of a neck ring (41) that can be opened, suitable for realization of the mouth (32) of the container (30) and consisting of a plurality of circumferential sectors (44) that can be moved away from each other, the method further comprising a step of opening the neck ring (41) at the end of the mould forming step, wherein each circumferential sector (44) performs, starting from a closed position of the neck ring (41), in which the circumferential sectors (44) are coplanar and form a substantially continuous annular element provided with a central axis (45), a first radial translation movement, in said coplanar configuration, moving away from the axis (45) of said annular element, followed by a second rotation movement of each circumferential sector (44) around a respective axis (46) directed perpendicular to the direction of the axis (45) of said annular element, up to an open position of the neck ring (41), wherein the circumferential sectors (44) are rotated out of said coplanar configuration, moving away from each other, around said axes (46) directed perpendicular to the direction of the axis (45) of said annular element.

2. Method according to claim 1, characterised in that the lateral walls (31) of the container (30) are made with a thickness lower than 1.5 mm.

3. Method according to claim 2, characterised in that the lateral walls (31) of the container (30) are made with a thickness lower than 1 mm.

\* \* \* \* \*